United States Patent [19]
Tiba et al.

[11] Patent Number: 4,814,223
[45] Date of Patent: Mar. 21, 1989

[54] LOW SMOKE AND HEAT RELEASE GLASS FIBER/CARBON FIBER/BISOXAZOLINE RESIN COMPOSITES AND METHOD OF MANUFACTURE

[75] Inventors: Omar Tiba, Dublin; Billy M. Culbertson, Worthington, both of Ohio; Donald D. Carlos, Louisville, Ky.

[73] Assignee: Ashland Oil, Inc., Ashland, Ky.

[21] Appl. No.: 129,497

[22] Filed: Dec. 7, 1987

[51] Int. Cl.$^4$ .................. B32B 17/04; B29C 67/14
[52] U.S. Cl. ........................... 428/246; 264/137; 264/258; 428/228; 428/268; 428/273; 428/285; 428/290
[58] Field of Search ............... 264/137, 237, 258; 156/309.6, 309.9; 428/228, 246, 268, 273, 285, 290

[56] References Cited

U.S. PATENT DOCUMENTS

| | | | |
|---|---|---|---|
| 4,076,873 | 2/1978 | Shea | 264/257 |
| 4,146,668 | 3/1979 | Dorey et al. | 264/258 |
| 4,213,930 | 7/1980 | Goodrich et al. | 264/137 |
| 4,430,491 | 2/1984 | Culbertson et al. | 528/148 |
| 4,474,942 | 10/1984 | Sano et al. | 528/288 |
| 4,515,934 | 5/1985 | Hefner, Jr. | 525/531 |
| 4,613,662 | 9/1986 | Goel | 528/138 |

FOREIGN PATENT DOCUMENTS 170963   10/1983   Japan ..................... 264/137

*Primary Examiner*—James Lowe
*Attorney, Agent, or Firm*—John F. Jones

[57] ABSTRACT

The formation of structural composites having low smoke release and low heat release properties by forming a sandwich comprising a non-woven fiber mat between woven glass fiber mats and impregnating said sandwich with a mixture of a bisoxazoline and a polyphenolic compound to form a prepreg which can be formed and molded at elevated temperatures is described.

13 Claims, No Drawings

LOW SMOKE AND HEAT RELEASE GLASS FIBER/CARBON FIBER/BISOXAZOLINE RESIN COMPOSITES AND METHOD OF MANUFACTURE

The present invention relates to structural composites comprising glass fibers, carbon fibers and bisoxazoline/polyphenolic resins, to their uncured composites or prepregs, the cured products thereof and to a method for their preparation. The cured composites exhibit excellent physical properties and have exceedingly low smoke and low heat release properties which are both desired, and are either presently required or will be required in the very near future as materials of construction for use in the interiors of commercial aircraft.

Polymeric compositions prepared by the copolymerization of polyphenolic compounds and compounds having at least two 2-oxazoline groups per molecule are described and claimed in U.S. Pat. No. 4,430,491 which is incorporated herein by reference. Improved processes for preparing these compositions are described in U.S. Pat. No. 4,613,662 and in Copending U.S. patent applications Ser. No. 880,477, filed 6/30/86; Ser. No. 022,310, filed 3/5/87 and Ser. No. 030,799, filed 3/27/87 which are all commonly assigned. U. S. Pat. No. 4,430,491 also describes the use of copolymers of polyphenolics and bisoxazolines in the formation of laminates in combination with glass cloth (see Examples XIII and XIV, of this patent, for instance).

We have discovered that prepregs and ultimately cured structural composites having unexpectedly low smoke and low heat release properties can be prepared by forming a sandwich structure comprised of at least one layer of non-woven carbon fibers in the form of a mat having a suitable layer of a woven non-combustible fibrous material such as glass fibers, carbon fibers, graphite fibers, boron fibers, silicon carbide fibers, asbestos fibers, and various metallic fibers (glass fiber is preferred) on each side of the carbon fiber layer and impregnating said sandwich structure with from about 20 to 40% by weight of the total sandwich structure of a resin prepared by the copolymerization of a polyphenolic compound and a bisoxazoline.

The Federal Aviation Administration (FAA) in July of 1986 ruled that materials used in the construction of commercial airliner cabins must be safer and must pass a 100/100 test from Aug. 21, 1988 until Aug. 21, 1990 and must pass a 65/65 heat release value as determined by the Ohio State University (OSU) test after Aug. 21, 1990. It has been predicted by industry authorities that this rule will require that a whole new range of materials be developed by the industry because the very few materials which showed some promise to date, unfortunately have characteristics that make them unacceptable for aircraft interiors. Resins currently used in aircraft interiors, such as epoxy resins, polyesters, etc., fail recent FAA heat release requirements. Modification of epoxy and polyester resin with halogen containing intermediates, provide improved heat flame resistance, but cause these materials to give off toxic gases when burned. The use of standard phenolic resins, which are attractive profiles for heat and flame resistance, is limited due to brittleness and out gassing problems. Also, 40% or greater standard phenolic resin is needed to provide required or needed strength for composite, causing laminate weight increases. Recent modifications on phenolic systems, to improve strength, have caused them to fail FAA rules for 1990.

The cured composites prepared in accordance with this invention readily meet all physical property requirements and easily meet the 65/65 FAA requirement which is applicable after 1990.

The tests used to determine whether or not a given material will pass the FAA requirements are carried out on an OSU (Ohio State University) heat release rate apparatus designed by Dr. Ed Smith which measures the heat evolved from a sample exposed to a steady state radiant heat source. The test chamber in the OSU test is not completely closed but has one measured airflow through it, past the sample. A second measured airflow is distributed around the exhaust stack to cool it and joins the first flow above the sample. The heat release rate is measured through a thermopile. The thermopile is composed of thermocouples suspended in the lower air stream of the chamber and in the exhaust stack of the chamber to measure the temperature of the air/smoke mixture leaving the sample. The thermopile output represents the temperature rise of the air passing through the chamber. Substracting the baseline radiant heat source contribution and using a calibration factor translates to the best release rate.

The heat release rate is recorded at one second intervals to produce a graph of the fuel contribution of the sample. In the report the heat release rate is stated in two ways: 1. The integral of the heat release rate during the first two minutes of the test. 2. The maximum heat release rate during the total five minutes of the test. The standard method of showing the two values is 2 minute integral/maximum rate (i.e., 100/100).

The bisoxazolines useful in the practice of this invention include a variety of such compounds having at least two 2-oxazoline groups. Representative polyfunctional oxazoline compounds useful in this invention include 4,4',5,5'-tetrahydro-2,2'-bisoxazole; a 2,2'-(alkanediyl) bis [4,5-dihydrooxazole], e.g., 2,2'-(arylene) bis [4,5-dihydrooxazole], e.g., 2,2'-(1,4-phenylene) bis [4,5-dihydrooxazole], 2,2'-(1,5-naphthalenyl) bis [4,5-dihydrooxazole] and 2,2'-(1,8-anthracenyl) bis [4,5-dihydrooxazole]; a sulfonyl, oxy, thio or alkylene bis 2-(arylene) [4,5-dihydrooxazole], e.g., sulfonyl bis 2-(1,4-phenylene) [4,5-dihydrooxazole], oxy bis 2-(1,4-phenylene) [4,5-dihydrooxazole], thio bis 2-(1,4-phenylene) [4,5-dihydrooxazole] and methylene bis 2-(1,4-phenylene) [4,5-dihydrooxazole]; a bis oxazine such as 2,2'-(1,3-phenylene)-bis[4.5-dihydro-4H-1,3oxazine] and 2,2'-(1,4-phenylene)-bis[4,5 Dihydro-4H-1,3-oxazine] a 2,2',2''-(arylene tris [4,5-dihydrooxazole], e.g., 2,2',2''-(1,3,5-phenylene) tris [4,5-dihydrooxazole]; a polymer with aromatic backbone containing pendent [2-(4,5-hydrooxazole)], e.g., poly[2-(2-propenyl)-4,5-dihydrooxazole] and other oligomeric or polymeric materials with pendent or terminal oxazoline or oxazine groups.

The polyphenolic compounds useful in this invention include those compounds having at least two aromatic hydroxyl groups per molecule including the bisphenols, the various benzene and fused aromatic ring diols and triols, e.g., 1,4-benzene diol (hydroquinone), 1,3-benzenediol (resorcinol), 1,4-naphthalene diol and 1,3,5-benzene triol; the biphenyl diols, e.g., [1,1'-biphenyl]-2,2'-diol; the alkylene and cycloalkylene bisphenols, e.g., 2,2'-methylene bisphenol, 4,4'-(1-methylethylidene) bisphenol (Bisphenol-A), 4,4'-(phenylmethylene) bisphenol, 4,4'-(cyclohexanediyl) bisphenol, 4,4'-1,2- diethyl-1,2-ethenediyl) bisphenol, and 3,4-bis (4-hydroxyphenyl)-2,4-hexadiene; the arylene bisphenols, e.g., 4,4'-phenylene bisphenol; the oxy, thio and sulfonylbisphenols, e.g., 2,3-oxybisphenol, 4,4'-thiobisphenol and 2,2'-sulfonyl bisphenol; the bis (hydroxyaryl alkanones, e.g., bis (4-hydroxyphenyl) methanone, 1,5-dihydroxy-9,10-anthracenedione and 4-[bis(4-hydroxyphenyl) methylene]-2,5-cyclohexadiene-1-one; the various benzamide and benzoate derivaties, e.g., 2-hydroxy-N-(4-hydroxyphenyl) benzamide, 4-hydroxy-4-hydroxyphenyl benzoate, 2-[methyl-2-](4-hydroxybenzoyl) oxy [methyl]-1,3-propanediyl-4-hydroxybenzoate, bis (4-hydroxy benzoate)-1,2-ethandiyl; 2-(4-hydroxy benzoate) ethyl ether, bis (4-hydroxybenzamide)-1,4-benzenediyl, and the like.

The above enumerations of oxazoline and phenolic compounds are illustrative of the respective types of compounds useful in the preparation of the polymers embodied in the present invention. In addition to the various isomers of these representative compounds, a broad variety of substituted compounds are likewise applicable, the sole requirement being that the substituent group is not reactive with either the oxazoline or the aromatic hydroxyl group. Examples of substituent groups included are alkyl, aryl, halo, cyano, nitro, alkoxy, aryloxy, alkyl and aryl sulfides, amine and alkyl or aryl substituted amine, amide, ester and the like groups.

In addition to the polyphenolic compounds noted above a variety of oligomers containing a plurality of phenolic groups constitute an important class of materials useful for reaction with the oxazolines or oxazines in this invention. Particularly representative of such oligomers are the base or acid catalyzed phenol-formaldehyde condensation resoles, the phenolic resins characterized in having benzylic ether linkages prepared by metal ion catalysts such as disclosed in U.S. Pat. No. 3,485,797 are also useful in this invention. Other suitable polyphenolic oligomers include aromatic polyethers, polysulfones, polyarylates, etc containing pendent and/or terminal phenolic hydroxyl residues.

The carbon fibers useful in this invention can be described as those carbon fibers obtainable from the processing of mesophase or nonmesophase petroleum pitch, carbon fibers and from coal tar pitch or similar carbon containing materials may also be used. Furthermore, carbon fibers made using PAN, acrylic or rayon precursors may also be used. The carbon fiber forms useful in this invention consist of paper, felt or mat (woven or nonwoven) structures.

Glass fibers, preferably in the form of woven glass cloth which are useful in the present invention include those described in "Modern Plastics Encyclopedia", 1986–87, page 136 and in U.S. Pat. No. 4,061,8129 for instance.

In the practice of this invention it is essential that the composite be made from a mat of carbon fibers which is preferably in the form of a non-woven mat or needle punched mat an the mat can be of various weights (6–12 ounces/square yard or multiples thereof) Although the carbon fiber mat may be used, per se, it is preferred that a sandwich of the carbon fiber mat between layers of glass fiber mats and preferably the glass fiber mats are woven glass cloth mats.

In practice, the carbon fiber mat or glass fiber-carbon fiber mat sandwich is generally impregnated with a solution of the bisoxazoline-polyphenolic resin using a solvent for the resin such as acetone, methanol, Isopropanol and mixtures thereof. Impregnation techniques include dipping, brushing, spraying, etc. and the like. The thus impregnated mat or sandwich is allowed to dry forming a prepreg (20–40% by weight resin content) which can then be cured by either vacuum bagging in an autoclave or by hot press curing at 150°–225° C. for from 1–2 hours to produce a laminate which has excellent physical properties and easily meets the flammability parameters which are now and in the immediate future required for commercial aircraft interior use set forth by the FAA.

This invention is further illustrated in the following representative examples.

EXAMPLE 1

A solution (35% solids) of 300 g of 2,2'-(1,3-phenylene)-bis[4,5-dihydrooxazole], 700 g of Alnovol PN320 (a phenol-free phenol-formaldehyde condensation novolac having a molecular weight of 3000–4000, acid No. 0-1, M.P. 83°–88° C. obtained from American Hoechst Co.), 20 g of diphenylphosphite and 10 g of dichloro-p-xylene in 1 kg of acetone was prepared having a weight ratio of Alnovol: 2,2'-(1,3-phenylene)-bis[4,5-dihydrooxazole] of 80:20. A sandwich was prepared from one square foot of a carbon fiber mat (Carboflex from Ashland Oil Company) which had a weight of 6 ounces per square yard which was placed between two plies (one on each side) of a woven glass fiber cloth (7781 glass from J. P. Stevens, 9 oz./yard$^2$. The sandwich was stitched together with glass threads to give a single pad weighing 88 g. The pad was then treated with the foregoing solution to form a prepreg which was drawn between two rollers and squeezed to a thickness of 0.09 inches.

The resulting prepreg was then dried in an oven at 200° F. for seven minutes. The dried prepreg sandwich, which weighed 147 g and was composed of about 60% by weight of fiber and 40% by weight of resin, was then press molded at 100 psi and 150° C. for 2 hours. The resulting cured sample was then cut into coupons for physical testing and the test results are given in the following Table.

EXAMPLE 2

The procedure of Example 1 was followed except that the non-woven carbon fiber mat was one having a weight of 12 ounces per square yard and the resulting prepreg contained 22% by weight of resin. The test data for the final cured composite are given in the following Table.

EXAMPLE 3

The procedure of Example 1 was followed except that the resin was a 70:30 Alnovol 320:2,2'-(1,3-phenylene) bis[4,5-dihydrooxazole]. The properties of the resulting cured and formed composite are given in the following Table.

EXAMPLE 4

The procedure of Example 1 was followed using a 40:60 weight ratio of Alnovol 320:2,2'-(1,3-phenylene)-bis[4,5-dihydrooxazole]. The properties for the final cured composite are given in the following Table.

EXAMPLE 5

The procedure of Example I was followed using a 80:20 weight ratio of Alnovol 320:2,2'-(1,4-phenylene) bis[4,5-dihydrooxazole]. The properties for the final cured composite are given in the following Table.

TABLE

| Property | COMPOSITE PROPERTIES | | | | |
| --- | --- | --- | --- | --- | --- |
| | Example 1 | Example 2 | Example 3 | Example 4 | Example 5 |
| Tensile Strength (PSI) | 20,500 | 14,500 | 19,800 | 18,200 | 19,800 |
| Tensile Modulus (PSI) | 1,799,000 | 1,232,000 | 1,539,000 | 1,981,000 | 2,450,800 |
| Elongation (%) | 1.7 | 1.4 | 1.7 | 1.3 | 1.2 |
| Flexural Strength (PSI) | 32,800 | 4,600 | 11,700 | 26,600 | 49,200 |
| Flexural Modulus (PSI) | 3,394,000 | 574,000 | 1,543,000 | 2,584,000 | 3,208,300 |
| Barcol Hardness | 26.7 | — | — | 35 | |
| OSU Test: | | | | | |
| Heat released in 2 min. (KW × Min. × $M^{-2}$) | 34 | 17 | 47 | 32 | 36 |
| Maximum Rate of Heat Released (KW × $M^{-2}$) | 38 | 22 | 59 | 43 | 39 |
| 2 min. integral/max. rate | 34/38 | 17/22 | 47/59 | 32/43 | 36/39 |
| Smoke Optical Density Test: | | | | | |
| $D_s$(4 min.) | | | | | |
| Flaming | 25 | 22 | 25 | 21 | |
| Non-Flaming | 5 | 6 | 3 | 5 | |
| $D_{max}$: | | | | | |
| Flaming | 38 | 22 | 39 | 34 | |
| Non-Flaming | 7 | 8 | 6 | 11 | |
| Carbon Fiber Mat (Oz./$yd^2$) | 6 | 12 | 6 | 6 | |
| Phenolic Resin/Bisoxazoline Ratio | 80/20 | 80/20 | 70/30 | 40/60 | 80/20 |
| Resin Conc. in Solution (%) | 35.0 | 25.0 | 35.0 | 35.0 | 30.0 |
| Resin Conc. in Prepreg (%) | 31.6 | 22.0 | 31.6 | 32.5 | 27.8 |

We claim:

1. A process for preparing a structural composite having low smoke release and low heat release properties comprising
   (A) forming a sandwich from (1) at least one layer of a non-woven mat formed from carbon fibers and (2) at least one layer of a woven mat formed from glass fibers,
   (B) impregnating the sandwich from (A) with a mixture comprising a bisoxazoline and a polyphenolic compound to form a prepreg, and
   (C) molding and curing the prepreg from (B) at a temperature in the range of from about 150° C. to 225° C. to form the composite.
2. The process of claim 1 wherein there is present in (B) from about 20 to 40% by weight of the bisoxazoline/polyphenolic compound mixture.
3. The process of claim 2 wherein the bisoxazoline in (B) is 2,2'-(1,3-phenylene)-bis(4,5-dihydrooxazole).
4. The process of claim 3 wherein the polyphenolic compound is a phenol-formaldehyde condensation product.
5. The process of claim 2 wherein the bisoxazoline is 2,2'-(1,4-phenylene) bis(4,5-dihydrooxazole).
6. The process of claim 5 wherein the polyphenolic compound is a phenol-formaldehyde condensation product.
7. The composite prepared by the process of claim 1, (A), (B) and (C).
8. The composite of claim 7 wherein there is present in (B) from about 20 to 40% by weight of the bisoxazoline/polyphenolic compound mixture.
9. The composite of claim 8 wherein the bisoxazoline in (B) is 2,2'-(1,3-phenylene)-bis(4,5-dihydrooxazole).
10. The composite of claim 9 wherein the polyphenolic compound is a phenol-formaldehyde condensation product.
11. The composite of claim 8 wherein the bisoxazoline is 2,2'-(1,4-phenylene) bis(4,5-dihydrooxazole).
12. The composite of claim 11 wherein the polyphenolic compound is a phenol-formaldehyde condensation product.
13. The prepreg prepared by the process comprising
    (A) forming a sandwich from (1) at least one layer of a non woven mat formed from carbon fibers and (2) at least one layer of a woven mat formed from glass fibers and
    (B) impregnating the sandwich from (A) with a mixture comprising a bisoxazoline and a polyphenolic compound to form a prepreg.

* * * * *